United States Patent Office 3,364,045
Patented Jan. 16, 1968

3,364,045
LAC COMPOSITIONS
Walter L. Krentler, 27731 Glenwood,
St. Clair Shores, Mich. 48081
No Drawing. Continuation-in-part of application Ser. No. 143,606, Oct. 9, 1961. This application June 16, 1965, Ser. No. 464,548
2 Claims. (Cl. 106—239)

This application is a continuation-in-part of my application Ser. No. 143,606, filed Oct. 9, 1961, now abandoned.

This relates to compositions and particularly to lac compositions which can be used for electrical water proofing, as lubricants in liquid or paste form and as paste polishes.

It is an object of this invention to provide a lac composition which can be used as an electrical water-proofing composition.

It is a further object of this invention to provide a lac composition which is in liquid form and can be used as a lubricant that will withstand high and low temperatures and have long life.

It is a further object of the invention to provide a lac composition which is of the paste type and will provide a novel polish that will withstand high and low temperatures, have long life and produce a high polish.

Basically, the lac composition embodying the invention comprises utilizing the decantate which is removed after a mixture of Kusmi lac or Bysaki lac and a solvent, such as butyl Cellosolve or titanium tetraalcoholate, is permitted to stand overnight. Cellosolve is a well known ethylene glycol monoethyl ether. This decantate, in the ratio of about 85% solids to 15% solvent by weight, is mixed with a suitable solvent such as toluol or xylene and utilized in making the various compositions embodying the invention.

Kusmi lac and Bysaki lac are commonly known seed lacs imported to the United States by various importers one of whom is Schwartz Bros. of Brooklyn, N.Y.

A lac which can be utilized in the various compositions is commonly available under the designation Siligon 40 and is manufactured by Anderson Chemical Company of Weston, Mich. Silgon 40 is made by mixing 50% by volume of methyl branch chain siloxane containing functional end groups (OH or OR) where R-ethyl and 50% by volume of alkyl titanate having an alkyl group from $C_1$ to $C_8$. This mixture is stirred and permitted to stand until it becomes clear.

To produce the lac which is used in the composition set forth below, a suitable solvent such at toluol is added.

Water-proofing composition

The above indicated lac decantate may be mixed with powdered rosin, an evaporating carrier and dimethyl siloxane.

A suitable dimethyl siloxane is known under the tradename F-15 and is manufactured by Dow Corning Corporation of Midland, Mich.

A suitable carrier comprises spirits of oleum but other carriers may be used as would be readily apparent to a person skilled in the art such as mineral spirits, Stoddard solvent, xylene and chlorothene.

A water-proofing composition that produces exceptional results comprises the following composition by volume:

| | Oz. |
|---|---|
| Lac decantate (85% solids) | 13 |
| Powdered rosin (1 oz. by weight per gallon of chlorothene) | 3 |
| Dimethyl siloxane | 3 |

Satisfactory water-proofing compositions comprise the following composition by volume:

| | Percent |
|---|---|
| Lac decantate (85% solids) | 7–12 |
| Powdered rosin | 1–5 |
| Spirits of oleum | 75–90 |
| Dimethyl siloxane | 2–5 |

A preferred composition comprises the following percentages by volume:

| | Percent |
|---|---|
| Lac decantate (85% solids) | 10 |
| Powdered rosin | 4 |
| Spirits of oleum | 84 |
| Dimethyl siloxane | 2 |

The resultant composition can be applied to electrical elements such as motors, lights, distributors, distributor points, magnetos, transformers, relays and the like by spraying, painting or dipping. Upon drying the resultant film or coating effectively water-proofs the articles. It has been found that a higher percentage of lac decantate is more useful where the electrical connections are exposed.

Lubricating oil composition

The lac decantate can be combined with a petroleum derivative such as kerosene and lubricating oil to provide an effective lubricating oil that is resistant to heat.

Satisfactory lubricating oil compositions comprise the following percentages by volume:

| | Percent |
|---|---|
| Lac decantate (85% solids) | 7–15 |
| Kerosene | 30–50 |
| No. 8 industrial oil without additives (SAE 10) | 32–58 |

A preferred lubricating oil composition comprises the following percentages by volume:

| | Percent |
|---|---|
| Lac decantate (85% solids) | 11 |
| Kerosene | 46 |
| No. 8 industrial oil without additives (SAE 10) | 43 |

The resultant lubricating oil compositions have been found to have a high resistance to heat flowing normally at 1200° F. The same compositions flow normally at very low temperatures such as −65° F. The oil compositions range in viscosity from 10 to 30 throughout this temperature change. The flow properties of the oil compositions are retained without loss of lubricating properties. On the contrary, the lubricating properties of the oil are greater than normal lubricating oils.

Lubricating paste

The lac decantate can be utilized in making a lubricating paste by the addition of a petroleum derivative such as kerosene and wax wherein the major constituent is the petroleum derivative.

Satisfactory lubricating pastes can be made by utilizing the following compositions in the percentages shown by volume:

| | Percent |
|---|---|
| Lac decantate (85% solids) | 9–15 |
| Kerosene | 63–87 |
| Microcrystalline wax | 5–12 |
| Carnauba wax | 7–9 |

A preferred composition comprises the following percentages by volume:

| | Percent |
|---|---|
| Lac decantate (85% solids) | 12 |
| Kerosene | 76 |
| Microcrystalline wax | 8 |
| Carnauba wax | 4 |

The resultant lubricating paste formed by mixing the above ingredients produces a paste lubricant that can be used for packing bearings and the like and also between moving parts of metal, wood or other materials. One application between friction surfaces produces anti-friction properties for a longer period of time. When used in sealed bearings, the anti-friction properties last indefinitely.

Paste polishes

The lac decantate can be utilized to make a long lasting paste polish for wood, metal and other surfaces by incorporating the lac decantate with a carrier and wax wherein the solvent comprises the major constituent.

Satisfactory paste polishes are produced by utilizing the following compositions in the percentages shown by volume:

|  | Percent |
|---|---|
| Lac decantate (85% solids) | 9–15 |
| Spirits of oleum | 60–80 |
| Microcrystalline wax | 8–12 |
| Carnauba wax | 4–8 |

A preferred composition for the paste polishes comprises the following percentages by volume:

|  | Percent |
|---|---|
| Lac decantate (85% solids) | 12 |
| Spirits of oleum | 72 |
| Microcrystalline wax | 10 |
| Carnauba wax | 6 |

The resultant paste polish can be applied to wood, metal or other surfaces to give a high gloss, water-proof finish.

I claim:

1. A water-proofing composition consisting essentially of a lac decantate, powdered rosin, a carrier and dimethyl siloxane in the following percentages by volume:

|  | Percent |
|---|---|
| Lac decantate (85% solids) | 7–12 |
| Powdered rosin | 1–5 |
| Carrier | 75–90 |
| Dimethyl siloxane | 2–5 | said lac decantate being selected from the group of (a) the product made by mixing a lac selected from the group consisting of Kusmi lac and Bysaki lac with ethylene glycol monoethyl ether, permitting the mixture to settle into layers and decanting the top layer, said decantate comprising approximately 85% solids, and (b) the product made by mixing 50% by volume of methyl branch chain siloxane containing functional end groups of $OC_2H_5$ and 50% by volume of alkyl titanate having an alkyl group from $C_1$ to $C_8$, stirring the mixture and permitting it to stand until it becomes clear and decanting the top layer, said decantate comprising approximately 85% solids; said carrier being selected from the group consisting of spirits of oleum, mineral spirits, Stoddard solvent, xylene and chlorothene.

2. The combination set forth in claim 1 wherein said composition consists essentially of the following percentages by volume:

|  | Percent |
|---|---|
| Lac decantate (85% solids) | 10 |
| Powdered rosin | 4 |
| Carrier | 84 |
| Dimethyl siloxane | 2 |

References Cited

UNITED STATES PATENTS

| 504,064 | 8/1893 | Field | 106—237 |
| 2,733,154 | 1/1956 | Taylor | 106—10 X |
| 2,812,263 | 11/1957 | Geen et al. | 106—10 |
| 2,839,482 | 6/1958 | Geen et al. | 106—10 X |
| 2,868,657 | 1/1959 | Sesso | 106—10 |

FOREIGN PATENTS 10,428  4/1890  Great Britain.

OTHER REFERENCES

Gregory, Uses and Applications of Chemical and Related Materials, Reinhold Pub. Co., New York, vol. 1, 1939, pp. 517–518.

Howes, Vegetable Gums and Resins, Pub. by the Chronica Botanica Co., Waltham, Mass., 1949. pp. 127 to 132. TP 978 H63 C.2 (copy in Group 146).

Practical Applications of Recent Lac Research, Ed. by H. K. Sen and M. Venugopalan of Orient Longmans LTD (pp. 105 to 111). TP 938 534p 1948 C.2. (copy in Group 146).

ALEXANDER H. BRODMERKEL, *Primary Examiner.*

J. B. EVANS, *Assistant Examiner.*